United States Patent [19]

Kitada et al.

[11] Patent Number: 4,604,525

[45] Date of Patent: Aug. 5, 1986

[54] RADIATION IMAGE STORAGE PANEL WITH DISPERSING AGENT

[75] Inventors: Akira Kitada; Kikuo Yamazaki; Hisashi Yamazaki, all of Kaisei, Japan

[73] Assignee: Fuji Photo Film Co., Ltd., Kanagawa, Japan

[21] Appl. No.: 751,122

[22] Filed: Jul. 2, 1985

[30] Foreign Application Priority Data

Jul. 4, 1984 [JP] Japan .................. 59-138831

[51] Int. Cl.$^4$ .............. H05B 33/00; G01T 1/20; C09K 11/02; C09K 11/08
[52] U.S. Cl. .............. 250/363 R; 250/327.2; 250/484.1; 250/486.1; 250/487.1; 252/301.36; 252/301.33; 252/301.34; 252/301.17; 252/356; 252/DIG. 1; 430/139; 430/495
[58] Field of Search ............ 250/363, 327.2, 484.1, 250/486.1, 487.1; 252/301.36, 301.33, 301.34, 301.17, 356, DIG. 1; 430/139, 495

[56] References Cited

U.S. PATENT DOCUMENTS

| | | | |
|---|---|---|---|
| 4,097,403 | 6/1978 | Tsutsumi et al. | 252/356 |
| 4,394,581 | 7/1983 | Takahashi et al. | 250/484.1 |
| 4,505,989 | 3/1985 | Umemoto et al. | 250/484.1 |

*Primary Examiner*—Richard L. Schilling
*Attorney, Agent, or Firm*—Gerald J. Ferguson, Jr.; James E. Bryan; Michael P. Hoffman

[57] ABSTRACT

In a radiation image storage panel comprising a support and a phosphor layer which comprises a binder and a stimulable phosphor dispersed therein and is colored with a colorant, the improvement which comprises said colorant is a pigment capable of absorbing a portion of stimulating rays for the stimulable phosphor and said phosphor layer contains a dispersing agent of at least one fatty acid ester selected from the group consisting of sorbitan fatty acid esters, polyoxyethylene sorbitan fatty acid esters and polyoxyethylene fatty acid esters.

9 Claims, No Drawings

RADIATION IMAGE STORAGE PANEL WITH DISPERSING AGENT

BACKGROUND OF THE INVENTION

1. Field of the Invention

This invention relates to a radiation image storage panel employed in a radiation recording and reproducing method utilizing a stimulable phosphor, and more particularly, to a radiation image storage panel comprising a support and a colored phosphor layer.

2. Description of Prior Arts

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at considerably smaller dose, as compared with the conventional radiography. Accordingly, this method is of great value especially when the method is used for medical diagnosis.

The radiation image storage panel employed in the radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock. The transparent protective film is generally formed on the phosphor layer by combining a thin film which is beforehand prepared, with the phosphor layer through an adhesive agent.

The phosphor layer comprises a binder and stimulable phosphor particles dispersed therein. The stimulable phosphor emits light (gives stimulated emission) when excited with stimulating rays after having been exposed to a radiation such as X-rays. Accordingly, the radiation having passed through an object or having radiated from an object is absorbed by the phosphor layer of the radiation image storage panel in proportion to the applied radiation dose, and a radiation image of the object is produced in the panel in the form of a radiation energy-stored image. The radiation energy-stored image can be released as stimulated emission (light emission) by sequentially irradiating (scanning) the panel with stimulating rays. The stimulated emission is then photoelectrically detected to obtain electric signals, so as to reproduce a visible image from the electric signals.

The radiation image recording and reproducing method is very useful for obtaining a radiation image as a visible image as described hereinbefore, and it is desired for the radiation image storage panel employed in the method to provide an image of high quality (high sharpness, high graininess, etc.).

The sharpness of an image in the radiation image recording and reproducing method generally depends not on the spread of the light emitted by the stimulable phosphor within the radiation image storage panel, but on the spread of stimulating rays therewithin. That is because the radiation energy-stored image recorded on the panel is sequentially detected. For enhancing the sharpness of the image provided by the panel, it has been proposed to color the panel with a colorant capable of absorbing a portion of the stimulating rays for the stimulable phosphor contained therein (Japanese Patent Provisional Publication No. 55(1980)-163500, which corresponds to U.S. Pat. No. 4,394,581, etc.). The publication discloses that the sharpness of the image is effectively improved when the phosphor layer of the panel is colored with the colorant.

However, when a pigment is employed as the colorant to color the radiation image storage panel, it was extremely difficult to obtain a coating dispersion which comprises phosphor particles and the pigment homogeneously dispersed in a binder solution even by use of a dispersing apparatus, etc. A dispersing agent such as phthalic acid, stearic acid or caproic acid has been conventionally known for employment in the coating dispersion to improve the dispersibility of the phosphor particles therein. Even when a dispersing agent is added to the coating dispersion to disperse mechanically, the homogeneous coating dispersion containing the phosphor particles and pigment can not be easily obtained.

A colored phosphor layer formed by applying the heterogeneous coating dispersion onto a support shows portions where the phosphor particles and pigment densely exist and other poritons where they sparsely exist, because of the nonuniform dispersibility thereof. As a result, the stimulating rays are excessively absorbed by the condensed portions of the pigment so that the radiation image storaage panel having such colored phosphor layer gives an image on which a number of fine white spots are occurred.

In addition to the occurrence of the white spots owing to the agglomeration of the pigment, there is a tendency that the graininess of the image lowers because of the nonuniform dispersibility of the phosphor particles in the phosphor layer. Further, the poorly dispersed pigment can not satisfactorily bring about the enhancement of the sharpness of the image, though the phosphor layer is so colored with the pigment as to improve the sharpness of the image.

SUMMARY OF THE INVENTION

It is an object of the present invention to provide a radiation image storage panel having a phosphor layer colored with a pigment, which gives an image improved in the image quality, particularly an image where the white spots owing to the condensation of the pigment are not produced.

It is another object of the present invention to provide a radiation image storage panel having a phosphor layer colored with a pigment, which gives an image improved in the image quality, particularly in the sharpness and graininess.

The objects can be accomplished by a radiation image storage panel comprising a support and a phosphor layer which comprises a binder and a stimulable phosphor dispersed therein and is colored with a colorant, characterized in that said colorant is a pigment capable of absorbing a portion of stimulating rays for the stimulable phosphor and said phosphor layer contains a dispersing agent of at least one fatty acid ester selected from the group consisting of sorbitan fatty acid esters, polyoxyethylene sorbitan fatty acid esters and polyoxyethylene fatty acid esters.

As a result of the study on the dispersing agent for dispersing the phosphor particles and the pigment homogeneously in the binder solution in the process for the formation of the colored phosphor layer, the present inventors found that the specific dispersing agent can be effectively employed to easily form a uniform phosphor layer comprising the phosphor particles and pigment dispersed in the binder. It is known to employ a lipophilic surfactant as the dispersing agent for the formation of the phosphor layer. The inventors now has discovered that the specially selected nonionic dispersing agent is prominently effective for the preparation of the colored phosphor layer.

DETAILED DESCRIPTION OF THE INVENTION

The present invention accomplishes the improvement in the quality of an image provided by the radiation image storage panel, by using a dispersion containing a specific dispersing agent in combination with the stimulable phosphor and the pigment as the coating dispersion for the preparation of the colored phosphor layer.

More in detail, the employment of at least one fatty acid ester selected from the group consisting of sorbitan fatty acid esters, polyoxyethylene sorbitan fatty acid esters and polyoxyethylene fatty acid ester as the dispersing agent for the phosphor layer, brings about the improvement of the affinity among the phosphor particles, the pigment and the binder in the coating dispersion. Thus, a coating dispersion in which the phosphor particles and pigment are homogeneously dispersed can be obtained.

The stimulable phosphors such as divalent europium activated alkaline earth metal fluorohalide phosphors and rare earth element activated rare earth oxyhalide phosphors have been known to employ in the radiation image storage panel. These phosphors give stimulated emission having a peak at approx. 390 nm and 440 nm, respectively, when excited with an electromagnetic wave in the wavelength region of 400–900 nm after exposure to a radiation such as X-rays. Therefore, an organic or inorganic colorant having a body color ranging from blue to green has been proposed to employ for the colorant capable of selectively absorbing the stimulating rays.

According to the present invention, the dispersibility of the phosphor particles and the pigment in the coating dispersion can be remarkably improved, especially in the case of using a blue or green pigment such as ultramarine blue. The radiation image storage panel comprising a colored phosphor layer formed by using such homogeneous coating dispersion can provide an image on which the white spots are not produced and improved in the sharpness, because the pigment is uniformly dispersed in the phosphor layer. Further, the high dispersibility of the phosphor particles in the phosphor layer can give enhancement of graininess of the image.

The radiation image storage panel of the present invention having the above-described advantages can be prepared, for instance, in the following manner.

The support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in U.S. patent application Ser. No. 496,278 file date May 18, 1983, the phosphor layer-side surface of the support (or the surface of a subbing layer, light-reflecting layer, or light-absorbing layer in the case that such layers are provided on the phosphor layer) may be provided with protruded and depressed portions for enhancement of the sharpness of the image.

On the support, a phosphor layer is formed. The phosphor layer which is a characteristic requisite of the present invention is a colored layer comprising a binder, stimulable phosphor particles and pigment dispersed therein, and further containing a specific dispersing agent.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$, Mg$_x$, Ca$_y$)FX:aEu$^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

(Ba$_{1-x}$, M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in U.S. Pat. No. 4,239,968;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 \leq y \leq 0.2$, respectively, as described in Japanese Patent Provisional Publication No. 55(1980)-160078;

(Ba$_{1-x}$,M$^{II}_x$)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 \leq z \leq 10^{-2}$, respectively, as described in Japanese Patent Provisional Publication No. 56(1981)-116777;

(Ba$_{1-x}$,M$^{II}_x$)F$_2$.aBaX$_2$:yEu,zB, in which M$^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively, as described in Japanese Patent Provisional Publication No. 57(1982)-23673;

(Ba$_{1-x}$,M$^{II}_x$)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

M$^{III}$OX:xCe, in which M$^{III}$ is at least one trivalent metal selected from the group consisting of Pr, Nd, Pm, Sm, Eu, Tb, Dy, Ho, Er, Tm, Yb, and Bi; X is at least one element selected from the gruop consisting of Cl and Br; and x is a number satisfying the condition of $0 < x < 0.1$, as described in Japanese Patent Provisional Publication No. 58(1983)-69281;

Ba$_{1-x}$M$_{x/2}$L$_{x/2}$FX:yEu$^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in U.S. patent application Ser. No. 497,805 file date May 25, 1983;

BaFX.xA:yEu$^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively, as described in U.S. patent application Ser. No. 520,215 file date Aug. 4, 1983;

BaFX.xA:yEu$^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in U.S. patent application Ser. No. 502,648 file date June 9, 1983;

BaFX.xNaX':aEu$^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Provisional Publication No. 59(1984)-56479;

M$^{II}$FX.xNaX':yEu$^{2+}$:zA, in which M$^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in U.S. Patent Application Ser. No. 535,928 file date Sept. 26, 1983; and M$^{II}$FX.aM$^{I}$X'.bM$^{'II}$X''$_2$.cM$^{III}$X'''$_3$.xA:yEu$^{2+}$, in which M$^{II}$ is at least one alkaline earth metal selected from the group consisting of Ba, Sr and Ca; M$^{I}$ is at least one alkali metal selected from the group consisting of Li, Na, K, Rb and Cs; M$^{'II}$ is at least one divalent metal selected from the group consisting of Be and Mg; M$^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in U.S. patent application Ser. No. 543,326 file date Oct. 19, 1983.

Among the above-described stimulable phosphors, the divalent europium activated alkaline earth metal fluorohalide phosphor and rare earth element activated rare earth oxyhalide phosphor are particularly preferred, because these show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

The colorant employed for coloring the phosphor layer in the radiation image storage panel of the invention is a pigment capable of absorbing at least a portion of the stimulating rays for the stimulable phosphor contained therein. The pigment preferably has such reflection characteristics that the mean reflectance in the wavelength region of the stimulating rays for the stimulable phosphor is lower than the mean reflectance in the wavelength region of the light emitted by said stimulable phosphor upon stimulation thereof.

From the viewpoint of improving the sharpness of the image provided by the panel, it is desired that the mean reflectance of the pigment in the wavelength region of the stimulating rays is as low as possible. On the other hand, from the viewpoint of improving the sensitivity of the panel, it is desired that the mean reflectance of the pigment in the wavelength region of the light emitted by the stimulable phosphor is as high as possible.

Accordingly, the preferred pigment depends on the nature of the stimulable phosphor employed in the radiation image storage panel. From the viewpoint of practical use, the stimulable phosphor is preferred to give stimulated emission in the wavelength region of 300–500 nm when excited with stimulating rays in the wavelength region of 400–900 nm as described above. Employable for such a stimulable phosphor is a pigment having a body color ranging from blue to green so that the mean reflectance thereof in the wavelength region of the stimulating rays is lower than the mean reflectance thereof in the wavelength region of the emitted light and that the difference therebetween is as large as possible.

Examples of the preferred pigment employable in the invention include the inorganic pigments disclosed in the aforementioned U.S. Pat. No. 4,394,581, such as ultramarine blue, cobalt blue, cerulean blue, chromium oxide, $TiO_2$—$ZnO$—$CoO$—$NiO$ pigment.

Among these pigments having a body color ranging from blue to green, the ultramarine blue is particularly preferably employed in combination with the divalent europium activated alkaline earth metal fluorohalide phosphor or the rare earth element activated rare earth oxyhalide phosphor.

Examples of the dispersing agent employable in the invention for the improvement of the dispersibility of the stimualble phosphor and pigment include esters of sorbitan with higher fatty acid having 12–18 carbon atoms such as sorbitan lauric acid ester, sorbitan myristic acid ester, sorbitan palmitic acid ester, sorbitan oleic acid ester, and sorbitan stearic acid ester; esters of polyoxyethylene sorbitan with higher fatty acid having 12–18 carbon atoms such as polyoxyethylene sorbitan lauric acid ester, polyoxyethylene sorbitan myristic acid ester, polyoxyethylene sorbitan palmitic acid ester, polyoxyethylene sorbitan oleic acid ester and polyoxyethylene sorbitan stearic acid ester; and esters of polyoxyethylene with higher fatty acid having 12–18 carbon atoms ester such as polyoxyethylene lauric acid ester, polyoxyethylene myristic acid ester, polyoxyethylene palitic acid ester, polyoxyethylene oleic acid ester and polyoxyethylene stearic acid ester. These fatty acid esters are known as nonionic surfactants.

The present inventors studied on a variety of the dispersing agents other than the above-mentioned ones, but radiation image storage panels containing the following dispersing agents could not provide images improved in the image quality:

Silicone surfactants (Shin-Etsu Silicone KBM403 and KBM352 available from Shin-Etsu Chemical Industry Co., Ltd. and Toray Silicone SH29PA, SH21PA and DC3PA available from Toray Shilicone Co., Ltd.); perfluoroalkyl ethylene oxide adducts (Megafac F-142D and F-144D available from Dainippon Ink & Chemicals Inc.); oligomer containing a perfluoroalkyl group, hydrophilic group and lipophilic group (Megafac F-177 available from the same); urethane containing a perfluoroalkyl group and lipophilic group (Megafac F-184 available from the same); perfluoroalkyl phosphate (Megafac F-191 available from the same); polyoxyethylene alkyl ethers (Emulmine 50 and 140 available from Sanyo Chemical Industries, Ltd.); polyoxyethylene-polyoxypropylene block polymers (Newpole PE-64 and PE-78 available from the same); composition of polyoxyethylene alkylphenyl ether and sodium sulfuric acid ester (Nonipole S-40 available from the same); polyoxyethylenepolyoxypropylene surfactant (Sannix TL4500 available from the same); polyoxyethylene alkylamine (Naimine S-215 available from Nippon Oil & Fats Co., Ltd.); specific phenol polyglycol ether (Eleminol HB-29 available from Sanyo Chemical Industries, Ltd.); sucrose benzoate (Sucrose benzoate available from Velsicol Chemical Corp.); aliphatic polyhydric caboxylic acid (Disparlon #2150 available from Kusumoto Chemicals, Ltd.); organic acid (Disparlon #701 available from the same); salt of polyamino amide and high molecular acid polyester (Disparlon #1860 available from the same); polyether-ester type anionic surfactant (Disparlon #7004 available from the same); unsatulated polycarboxylic acid of high molecular weight (Byk P 104 available from Byk-Mallinckrodt Chemische Prod.); composition of unsatulated acid of high molecular weight and silicone resin (Byk P 104S available from the same); polycarboxylic acid alkyl amide (Disperbyk available from the same); sodium dioctyl sulfosuccinate (Aerosol OT-100 available from Nippon Syanamide Co., Ltd.); polycarboxylic acid-type macromolecular surfactant (Caribon L-400 available from Sanyo Chemical Industries, Ltd.); polycarboxylic acid-type anionic surfactant (Polystar OM available from Nippon Oil & Fats Co., Ltd.); condensation product of naphthalene sulfonic acid and formalin (Demol N available from Kao Soap Co., Ltd.); polyacrylic acid-type anionic surfactants (Nopcosant R and SN-dispersant 5033 and 5040 available from Sannopco, Ltd.); lignin sulfonic acid surfactant (Vanilex HW available from Sanyo Kokusai Pulp Co., Ltd.); calcium denatured lignin sulfonate (Sanekis SCL available from the same); octyl alcohol, 2-ethyl hexyl alcohol, nonyl alcohol and decyl alcohol (Kalcohol 10 available from Kao Soap Co., Ltd.); polyethylene glycol; nonyl cellosolve; linolic acid; oleic acid; and tributhyl phoshate.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose actetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The phosphor layer can be formed on the support, for instance, by the following procedure.

In the first place, stimulable phosphor particles, a pigment, a dispersing agent and a binder are added to an appropriate solvent, and then they are mixed to prepare a coating dispersion comprising the phosphor particles and pigment homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The ratio between the binder and the pigment in the coating dispersion may be determined according to the nature and content of the phosphor, and is generally within the range of from 1:10 to 105:1 (binder : pigment, by weight).

The amount of the dispersing agent to be contained in the coating dispersion is generally within the range of from 0.01 to 30% by weight and preferably from 0.01 to 5% by weight.

The coating dispersion may further contain a variety of additives such as a plasticizer for increasing the bonding between the binder and the phosphor particles in the phosphor layer. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles, the pigment, the dispersing agent and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a colored phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, and preferably from 50 to 500 $\mu$m.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

On the surface of the phosphor layer, a tansparent protective film is preferably provided to protect the phosphor layer from physical and chemical deterioration.

The protective film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 $\mu$m.

For the improvement of the sharpness of the resulting image, the phosphor layer of the radiation image storage panel may contain a white powder as described in U.S. Pat. No. 4,350,893.

The following examples further illustrate the present invention, but these examples are by no means understood to restrict the invention. In the following examples, the term of "part" means "part by weight", unless otherwise specified.

EXAMPLE 1

A particulate divalent europium activated barium fluorobromide (BaFBr:Eu$^{2+}$) phosphor was added to methyl ethyl ketone to prepare a dispersion containing the phosphor particles.

Independently, a polyacrylic resin (trade name: Criscoat P-1018GS, available from Dainippon Ink & Chemicals Inc., Japan) was added to methyl ethyl ketone to prepare a polyacrylic resin solution. Nitrocellulose (trade name: RS-120, available from Daicel Co., Ltd.) was added in methyl ethyl ketone to prepare a nitrocellulose solution.

The polyacrylic resin solution and the nitrocellulose solution were added to the phosphor-containing dispersion. Ultramarine blue (pigment, trade name: PB100, available from Daiichi Kasei Co., Ltd.), polyoxyethylene diolate (dispersing agent, number of oxyethylene unit: 7) and tricresyl phosphate were added to the dispersion, and they was sufficiently stirred by means of a propeller agitator to obtain a homogeneous coating dispersion having a mixing ratio of 1:33 (binder:phosphor, by weight) and a viscosity of 25-35 PS (at 25° C.).

| Composition of the Coating Dispersion | | |
|---|---|---|
| BaFBr:Eu$^{2+}$ phosphor | 300 | parts |
| Polyacrylic resin | 7.6 | parts |
| Nitrocellulose | 1.4 | parts |
| Ultramarine blue | 0.010 | part |
| Tricresyl phosphate | 0.5 | part |
| Polyoxyethylene diolate | 1.5 | parts |
| Methyl ethyl ketone | 111 | parts |

Then, the coating dispersion was applied evenly onto a polyethylene terephthalate sheet (support, thickness: 250 μm) placed horizontally on a glass plate. The application of the coating dispersion was carried out using a doctor blade. After the coating was complete, the support having the coating dispersion was placed in an oven and heated at a temperature gradually rising from 25° to 100° C. Thus, a colored phosphor layer having the thickness of approx. 300 μm was formed on the support.

On the colored phosphor layer was placed a polyethylene terephthalate transparent film (thickness: 10 μm; provided with a polyester adhesive layer on one surface) and they were pressed by a hot roll to combine the film and the phosphor layer with the adhesive layer. Thus, a radiation image storage panel consisting essentially of a support, a colored phosphor layer and a transparent protective film was prepared.

COMPARISON EXAMPLE 1

A radiation image storage panel consisting essentially of a support, a colored phosphor layer and a transparent protective film was prepared in the same manner as described in Example 1, except that the dispersing agent was not added to the coating dispersion.

COMPARISON EXAMPLE 2

A radiation image storage panel consisting essentially of a support, a colored phosphor layer and a transparent protective film was prepared in the same manner as described in Example 1, except that 1.5 parts of aliphatic polyhydric carboyxlic acid (trade name: Disparon #2150, available from Kusumoto Chemical Industries, Ltd.) for the dispersing agent was added to the coating dispersion in place of polyoxyethylene diolate.

COMPARISON EXAMPLE 3

A radiation image storage panel consisting essentially of a support, a colored phosphor layer and a transparent protective film was prepared in the same manner as described in Example 1, except that 1.5 parts of polyoxyethylene alkyl ethers (trade name: Emulmine 50, available from Sanyo Chemical Industries, Ltd.) for the dispersing agent was added to the coating dispersion in place of polyoxyethylene diolate.

EVALUATION

The radiation image storage panels prepared in Example 1 and Comparison Examples 1 to 3 were evaluated on the occurrence of white spot, the sharpness of the image and the graininess of the image according to the following tests.

(1) Occurrence of white spot

The radiation image storage panel was exposed to X-rays at voltage of 80 KVp and subsequently scanned with a He-Ne laser beam (wavelength: 632.8 nm) to excite the phosphor particles contained in the panel. The light emitted by the phosphor layer of the panel was detected and converted to electric signals by means of a photosensor (photomultiplier having spectral sensitivity of type S-5). From the electric signals a radiation image was reproduced and recorded on an ordinary photographic film by means of a film scanner. The visible image recorded on the film was observed with eyes to evaluate the occurrence of white spot. The results of the evaluation were marked by the following three levels of A, B and C.

A: The white spot was not observed.
B: Some white spots were observed, but there appeared no problem in practical use.
C: A great number of the white spots were observed.

(2) Sharpness of image

The radiation image storage panel was exposed to Xrays at voltage of 80 KVp through an MTF chart and subsequently scanned with a He-Ne laser beam to excite the phosphor particles contained therein. The light emitted by the phosphor layer of the panel was detected and converted to electric signals by means of the abovementioned photosensor. From the electric signals a radiation image of the MTF chart was reproduced as a visible image by an image reproducing apparatus, and the modulation transfer function (MTF) value of the visible image was determined.

(3) Graininess of Image

The radiation image storage panel was exposed to X-rays at voltage of 80 KVp and at dose of 10 mR, and subsequently scanned with a He—Ne laser beam to excite the phosphor particles contained therein. The light emitted by the phosphor layer of the panel was detected and converted to electric signals by means of the abovementioned photosensor. The electric signals were reproduced and recorded on an ordinary photographic film by means of a film scanner. The graininess of the visible image recorded on the film was evaluated to represent it by RMS value at photographic density of $D=1.2$ and at spetial frequency of 0.4-5 cycle/mm.

The results of the evaluation on the radiation image storage panels are set forth in Table 1.

TABLE 1

| | Occurrence of white spot | Sharpness | Graininess |
|---|---|---|---|
| Example 1 | A | 39.8 | $0.600 \times 10^{-2}$ |
| Com. Example 1 | C | 37.0 | $0.655 \times 10^{-2}$ |
| Com. Example 2 | C | 36.8 | $0.659 \times 10^{-2}$ |
| Com. Example 3 | C | 37.1 | $0.654 \times 10^{-2}$ |

As is evident from the results shown in Table 1, the radiation image storage panel of the present invention (Example 1) had no white spot and remarkably improved in the sharpness and graininess of the image, as compared with the conventional radiation image storage panel containing no dispersing agent (Comparison Example 1) and the radiation image storage panels containing other dispersing agents (Comparison Examples 2 and 3).

EXAMPLE 2

A radiation image storage panel consisting essentially of a support, a colored phosphor layer and a transparent protective film was prepared in the same manner as described in Example 1, except that sorbitan monoolate was employed for the dispersing agent in place of polyoxyethylene diolate to prepare a coating dispersion of the following composition.

| Composition of the Coating Dispersion | | |
|---|---|---|
| BaFBr:Eu$^{2+}$ phosphor | 300 | parts |
| Polyacrylic resin | 7.4 | parts |
| Nitrocellulose | 1.6 | parts |
| Ultramarine blue | 0.010 | part |
| Tricresyl phosphate | 0.5 | part |
| Sorbitan monoolate | 0.3 | part |
| Methyl ethyl ketone | 115 | parts |

EXAMPLE 3

A radiation image storage panel consisting essentially of a support, a colored phosphor layer and a transparent protective film was prepared in the same manner as described in Example 2, except that 0.3 part of polyoxyethylene sorbitan monostearate (number of oxyethylene groups: 20) for the dispersing agent was added to the coating dispersion in place of sorbitan monoolate.

COMPARISON EXAMPLE 4

A radiation image storage panel consisting essentially of a support, a colored phosphor layer and a transparent protective film was prepared in the same manner as described in Example 2, except that the dispersing agent was not added to the coating dispersion.

The radiation image storage panels prepared in Examples 2 to 4 and Comparison Example 4 were evaluated on the occurrence of white spot, the sharpness of the image and the graininess of the image according to the above-mentioned tests. The results are set forth in Table 2.

TABLE 2

| | Occurrence of white spot | Sharpness | Graininess |
|---|---|---|---|
| Example 2 | A | 39.5 | 0.602 × 10$^{-2}$ |
| Example 3 | A | 39.8 | 0.598 × 10$^{-2}$ |
| Com. Example 4 | C | 36.8 | 0.657 × 10$^{-2}$ |

As is evident from the results shown in Table 2, the radiation image storage panels according to the present invention (Examples 2 and 3) had no white spot and prominent improved in the sharpness and graininess of the image, as compared with the conventional radiation image storage panel containing no dispersing agent (Comparison Example 4).

We claim:

1. A radiation image storage panel comprising a support and a phosphor layer which comprises a binder and a stimulable phosphor dispersed therein and is colored with a colorant, characterized in that said colorant is a pigment capable of absorbing a portion of stimulating rays for the stimulable phosphor and said phosphor layer contains a dispersing agent of at least one fatty acid ester selected from the group consisting of sorbitan fatty acid esters, polyoxyethylene sorbitan fatty acid esters and polyoxyethylene fatty acid esters.

2. The radiation image storage panel as claimed in claim 1, in which said pigment is one having a body color ranging from blue to green.

3. The radiation image storage panel as claimed in claim 2, in which said pigment is at least one selected from the group consisting of ultramarine blue, cobalt blue, cerulean blue, chromium oxide and TiO$_2$—ZnO—CoO—NiO.

4. The radiation image storage panel as claimed in claim 3, in which said pigment is ultramarine blue.

5. The radiation image storage panel as claimed in claim 1, in which said dispersing agent is contained within the range of from 0.01 to 30% by weight of the stimulable phosphor.

6. The radiation image storage panel as claimed in claim 5, in which said dispersing agent is contained within the range of from 0.01 to 5% by weight of the stimulable phosphor.

7. The radiation image storage panel as claimed in claim 1, in which the mixing ratio between said binder and said stimulable phosphor is within the range of from 1:8 to 1:40, by weight.

8. The radiation image storage panel as claimed in claim 1, in which said stimulable phosphor is a divalent europium activated alkaline earth metal fluorohalide phosphor.

9. The radiation image storage panel as claimed in claim 1, in which said stimulable phosphor is a rare earth element activated rare earth oxyhalide phosphor.

* * * * *